(12) United States Patent
Li

(10) Patent No.: US 8,837,526 B2
(45) Date of Patent: Sep. 16, 2014

(54) CARRIER INDICATION METHOD FOR WIRELESS COMMUNICATION SYSTEM AND RELATED COMMUNICATION DEVICE

(75) Inventor: Chi-Fang Li, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 327 days.

(21) Appl. No.: 13/004,013

(22) Filed: Jan. 10, 2011

(65) Prior Publication Data
US 2012/0020308 A1    Jan. 26, 2012

Related U.S. Application Data

(60) Provisional application No. 61/293,720, filed on Jan. 11, 2010.

(51) Int. Cl.
*H04J 1/00* (2006.01)
*H04J 1/14* (2006.01)

(52) U.S. Cl.
USPC .................. 370/482; 370/485; 370/486

(58) Field of Classification Search
CPC .......... H04L 27/2602; H04L 27/2613; H04W 72/0413; H04W 72/042; H04W 72/0453; H04W 72/1284; H04W 72/1289
USPC .............. 370/328, 334, 441, 482, 485, 496
See application file for complete search history.

(56) References Cited

U.S. PATENT DOCUMENTS

| | | | |
|---|---|---|---|
| 2010/0215011 A1* | 8/2010 | Pan et al. | 370/329 |
| 2010/0329200 A1* | 12/2010 | Chen et al. | 370/329 |
| 2011/0019619 A1* | 1/2011 | Tseng | 370/328 |
| 2011/0038331 A1* | 2/2011 | Chmiel et al. | 370/329 |
| 2011/0070845 A1* | 3/2011 | Chen et al. | 455/91 |
| 2011/0076962 A1* | 3/2011 | Chen et al. | 455/68 |
| 2011/0080883 A1* | 4/2011 | Prakash et al. | 370/329 |
| 2011/0105050 A1* | 5/2011 | Khandekar et al. | 455/68 |
| 2012/0020308 A1* | 1/2012 | Li | 370/329 |

FOREIGN PATENT DOCUMENTS

TW    201136269    10/2011

OTHER PUBLICATIONS

European patent application No. 11000140.1, European Search Report mailing date: Jul. 28, 2011.
Office action mailed on Aug. 10, 2011 for the European application No. 11000140.1, p. 1-5.
Pantech & Curitel, "Carrier indicator in carrier aggregation for LTE-A", 3GPP TSG RAN WG1 Meeting #59, R1-094677, Nov. 9-13, 2009, Jeju, Korea, XP050389082, p. 1-4.
Texas Instruments, "PDCCH Carrier Indication Field for Cross-Carrier Scheduling", 3GPP TSG RAN WG1 #59, R1-094761, Nov. 9-13, 2009, Jeju, Korea, XP050389158, p. 1-4.
Motorola, "PDCCH Design for Cross-Carrier Operation Using CIF", 3GPP TSG RAN WG1 Meeting #59, R1-094830, Nov. 9-13, 2009, Jeju, Korea, XP050389225, p. 1-3.
LG Electronics, "Configuration and activation of carrier indicator field in PDCCH for multiple carrier aggregation", 3GPP TSG RAN WG1 #59, R1-094468, Nov. 9-13, 2009, Jeju, Korea, XP050388891, p. 1-6.

(Continued)

*Primary Examiner* — Benjamin H Elliott, IV
(74) *Attorney, Agent, or Firm* — Winston Hsu; Scott Margo

(57) ABSTRACT

A carrier indication method for a carrier aggregation function, which aggregates a plurality of carriers for a transmission between a network and a user equipment of a wireless communication system, includes indicating a first control signal in a first carrier of the plurality of carriers to control a second carrier of the plurality of carriers, wherein the second carrier is different from the first carrier.

14 Claims, 12 Drawing Sheets

(56) References Cited

OTHER PUBLICATIONS

Research in Motion UK Limited, "Discussion on explicit carrier indicator field ", 3GPP TSG RAN WG1 Meeting #59, R1-094460, Nov. 9-13, 2009, Jeju, Korea, XP050388886, p. 1-3.

Panasonic, "Discussion on PDCCH with carrier indicator", 3GPP TSG-RAN WG1 Meeting #59, R1-094496, Nov. 9-13, 2009, Jeju, Korea, XP050388917, p. 1-3.

Datang Mobile Communications Equipment Co. Ltd., "Way Forward on Carrier Indicator Field", 3GPP TSG RAN WG1 Meeting #59, R1-095070, Oct. 9-13, 2009, Jeju, Korea, XP002635056, p. 1-2.

3GPP TS 36.214 V9.0.0 (Dec. 2009).

3GPP TS 36.213 V9.0.1 (Dec. 2009) Technical Specification 3rd Generation Partnership Project; Technical Specification Group Radio Access Network; Evolved Universal Terrestrial Radio Access (E-UTRA); Physical layer procedures (Release 9).

3GPP TS 36.212 V9.0.0 (Dec. 2009) Technical Specification 3rd Generation Partnership Project; Technical Specification Group Radio Access Network; Evolved Universal Terrestrial Radio Access (E-UTRA); Multiplexing and channel coding (Release 9).

3GPP TS 36.201 V9.0.0 (Dec. 2009) Technical Specification 3rd Generation Partnership Project; Technical Specification Group Radio Access Network; Evolved Universal Terrestrial Radio Access (E-UTRA); LTE Physical Layer—General Description (Release 9).

3GPP TR 36.814 V1.5.0 (Nov. 2009) Technical Report 3rd Generation Partnership Project; Technical Specification Group Radio Access Network; Further Advancements for E-UTRA Physical Layer Aspects (Release 9).

3GPP TS 36.211 V9.0.0 (Dec. 2009) Technical Specification 3rd Generation Partnership Project; Technical Specification Group Radio Access Network; Evolved Universal Terrestrial Radio Access (E-UTRA); Physical Channels and Modulation (Release 9).

Office action mailed on Aug. 28, 2013 for the Taiwan application No. 100101015, filing date Jan. 11, 2011, p. 1-5.

\* cited by examiner

CARRIER INDICATION METHOD FOR WIRELESS COMMUNICATION SYSTEM AND RELATED COMMUNICATION DEVICE

CROSS REFERENCE TO RELATED APPLICATIONS

This application claims the benefit of U.S. Provisional Application No. 61/293,720, filed on Jan. 11, 2010 and entitled "Methods and Apparatuses for Carrier Indication in Communication Systems", the contents of which are incorporated herein.

BACKGROUND OF THE INVENTION

1. Field of the Invention

The present invention relates to a carrier indication method for a wireless communication system and related communication device, and more particularly, to a carrier indication method and communication device for indicating carriers of a carrier aggregation function in an LTE-Advanced system.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs). The LTE radio protocol stack includes the Layer 3, also known as the Radio Resource Control (RRC) layer, the Layer 2, consisting of three sublayers that are the Packet Data Convergence Protocol (PDCP) layer, the Radio Link Control (RLC) layer, and the Medium Access Control (MAC) layer, and the Layer 1, also known as the Physical (PHY) layer.

Please refer to FIG. 1. FIG. 1 is a diagram illustrating a carrier utilized in the LTE system. In the LTE system, the transmission from a UE to the network is achieved through a single uplink carrier and the transmission from the network to the UE is achieved through a single downlink carrier. As shown in FIG. 1, a carrier 11 has a control region 121, a data region 131, and a carrier indicator 111. The control region 121 carries one or multiple control signals, e.g. the control signal 101. The data region carries system data, user data, and/or other information. The carrier indicator 111 indicates that the carrier 11 is the carrier on which the data region 131 is controlled by control signals, e.g. the control signal 101, in the control region 121.

In the LTE system, for example, since there is no any other carrier except the carrier 11 for a transmission between the UE and the network, the control signals, e.g. the control signal 101, in the control region 121, are undoubtedly designated to the carrier 11 and therefore the carrier indicator 111 is not necessarily required.

Recently, the 3GPP is involved in the further advancements for E-UTRA and proposes an LTE-Advanced system as an enhancement of the LTE system. The LTE-Advanced system introduces the concept of Carrier Aggregation (CA), where two or more carriers are aggregated, in order to support wider transmission bandwidths, e.g. up to 100 MHz and for spectrum aggregation. A UE of the LTE-Advanced system can simultaneously receive and/or transmit on multiple carriers. However, in the LTE-Advanced system, the relations between the carrier indicators, multiple carriers, the control regions, and the data regions, are not specified.

SUMMARY OF THE INVENTION

The present invention therefore provides a carrier indication method for a carrier aggregation function, which aggregates a plurality of carriers for a transmission between a network and a user equipment of a wireless communication system and related communication device.

According to one aspect of the present invention, a carrier indication method for a carrier aggregation function, which aggregates a plurality of carriers for a transmission between a network and a user equipment of a wireless communication system is provided. The carrier indication method comprises indicating a first control signal in a first carrier of the plurality of the carriers to control a second carrier of the plurality of the carriers; wherein the second carrier is different from the first carrier.

According to another aspect of the present invention, a carrier indication method for a carrier aggregation function, which aggregates a plurality of carriers for a transmission between a network and a user equipment of a wireless communication system, the carrier indication method comprising indicating a first and a second control signals in a first carrier of the plurality of the carriers to control a second and a third carriers of the plurality of carriers in a first and a second transmission time intervals; wherein the first and the second transmission time intervals are different.

According to another aspect of the present invention, a communication device of a wireless communication system with carrier indication for a carrier aggregation function, which aggregates a plurality of carriers for a transmission between a network and a user equipment of the wireless communication system, is provided. The communication device comprises means for indicating a first control signal in a first carrier of the plurality of the carriers to control a second carrier of the plurality of the carriers; wherein the second carrier is different from the first carrier.

According to another aspect of the present invention, a communication device for a carrier aggregation function, which aggregates a plurality of carriers for a transmission between a network and a user equipment of a wireless communication system, the communication device comprising means for indicating a first and a second control signals in a first carrier of the plurality of the carriers to control a second and a third carriers of the plurality of carriers in a first and a second transmission time intervals; wherein the first and the second transmission time intervals are different.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
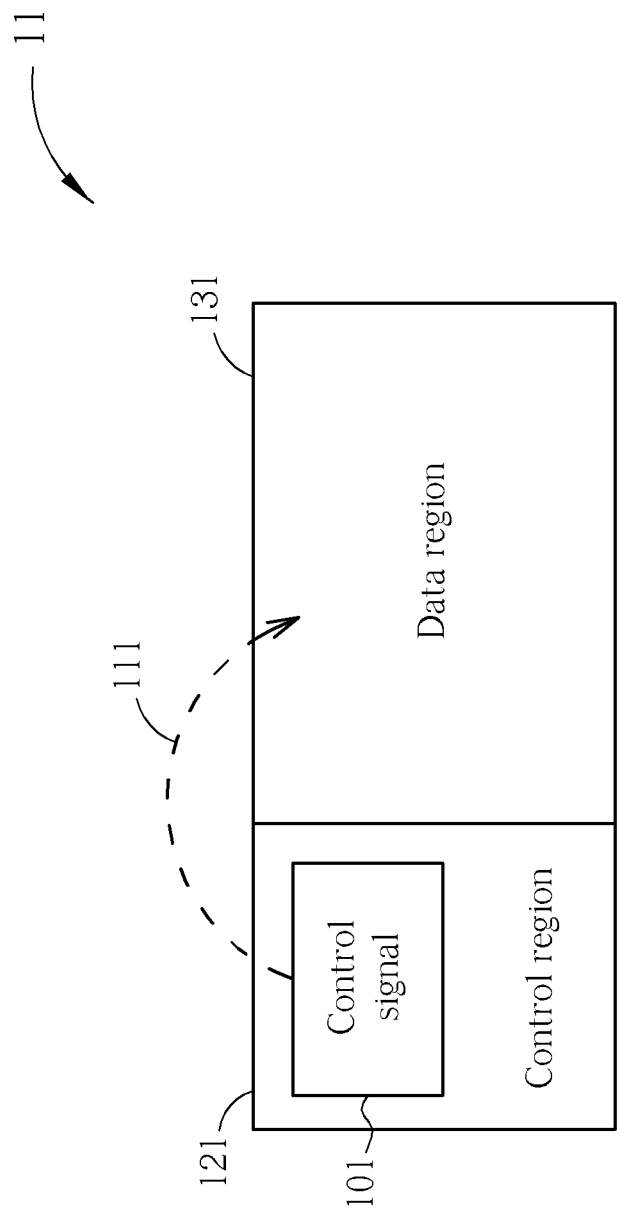
FIG. 1 is a diagram illustrating a carrier utilized in the LTE system.
Figure 2:
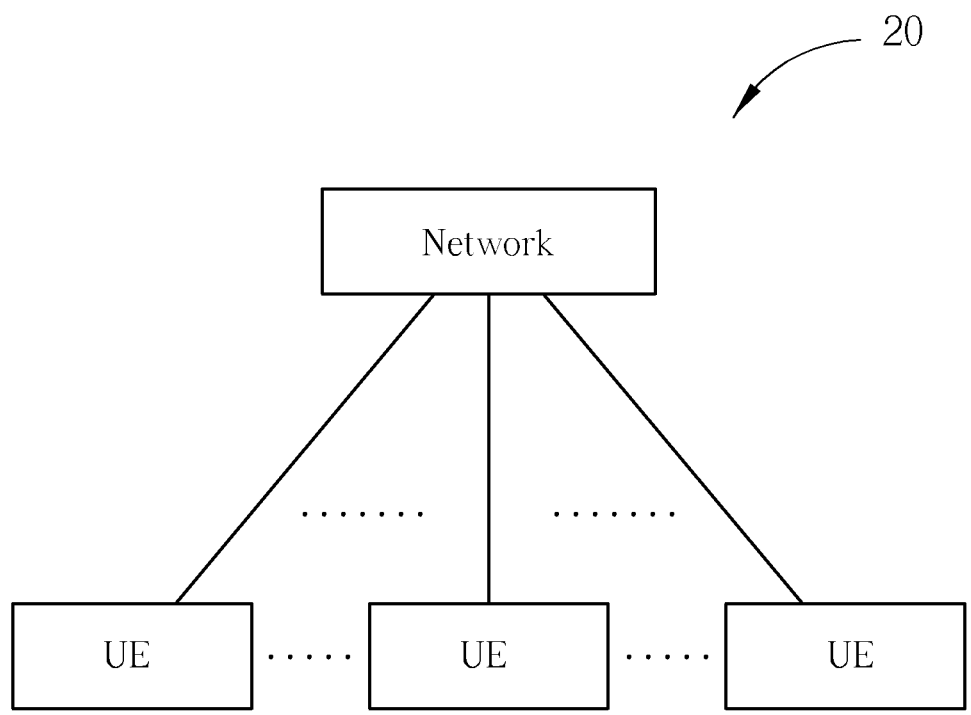
FIG. 2 is a schematic diagram of a wireless communication system 20 of the present invention.

Please refer to FIG. 2. FIG. 2 is a schematic diagram of a wireless communication system 20 of the present invention. The wireless communication system 20 can be an LTE-Advanced system, or other mobile communication systems. The wireless communication system 20 is briefly composed of a network and a plurality of user equipments (UEs), as the structure illustrated in FIG. 2. In the LTE-Advanced system, the network is referred as an evolved universal terrestrial radio access network (E-UTRAN) comprising a plurality of evolved base stations (eNBs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 3:
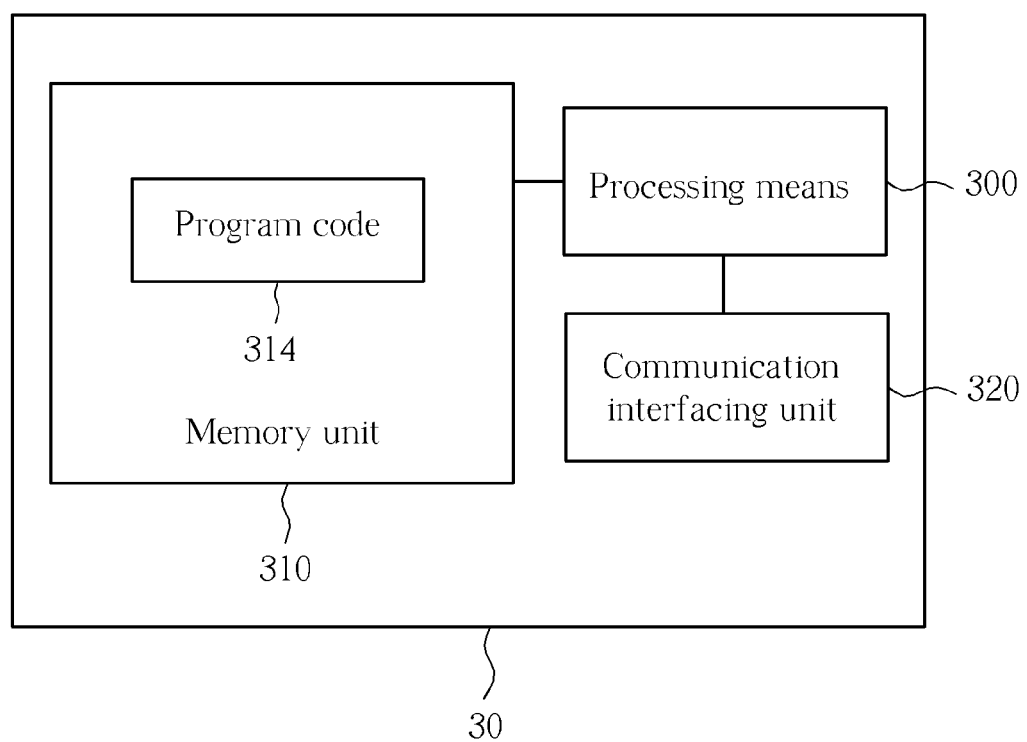
FIG. 3 is a schematic diagram of a communication device according to an example of the present invention.

Please refer to FIG. 3. FIG. 3 is a schematic diagram of a communication device 30 according to an example of the present invention. The communication device 30 can be the UE or the network shown in FIG. 2 and may include a processing means 300 such as a microprocessor or ASIC, a memory unit 310, and a communication interfacing unit 320. The memory unit 310 may be any data storage device that can store program code 314 for access by the processing means 300. Examples of the memory unit 310 include but are not limited to a subscriber identity module (SIM), read-only memory (ROM), random-access memory (RAM), CD-ROMs, magnetic tapes, floppy disks, and optical data storage devices. The communication interfacing unit 320 is preferably a radio transceiver for wirelessly communicating with the network according to processing results of the processing means 300.

In the present invention, wired or wireless communication channels are represented by "carriers" for wording convenience and simplicity. UEs are usually access through one of carriers and each carrier has its own control signals corresponding to the carrier itself. While UEs make use of more than one carrier, control signals for these used carriers might be transferred by one or more than one of these used carriers. That means control signals transmitted on a carrier might carry control messages or data for the transmission carrier and/or one or multiple other carriers. The following description describes methods for indicating which carrier the control signals are dedicated to while multiple carriers are used.

Figure 4:
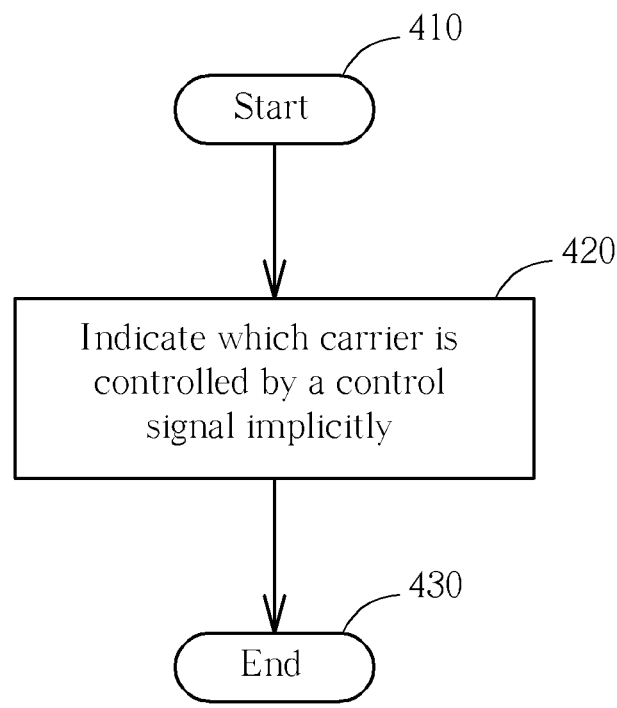
FIG. 4 is a flowchart illustrating a carrier indication method according to a first embodiment of the present invention.

Please refer to FIG. 4. FIG. 4 is a flowchart illustrating a carrier indication method according to a first embodiment of the present invention. The carrier indication method 40 is utilized for indicating relation between carriers and control signals of a carrier aggregation function in a transmission between a network and a UE in the wireless communication system 20. The method 40 comprises the following steps:

Step 410: Start.

Step 420: Indicate which carrier(s) is controlled by a control signal implicitly.

Step 430: End.

In step 420, a control signal of one carrier can be indicated to control the data region of the same carrier or another carrier implicitly. The term "implicitly", in the present invention, can be explained as the relation between the control signals and the carriers is predetermined during the configuration between the network and the UE and therefore it is not necessary that additional information is to be required to indicate which carrier a control signal is dedicated to.

Figure 5:
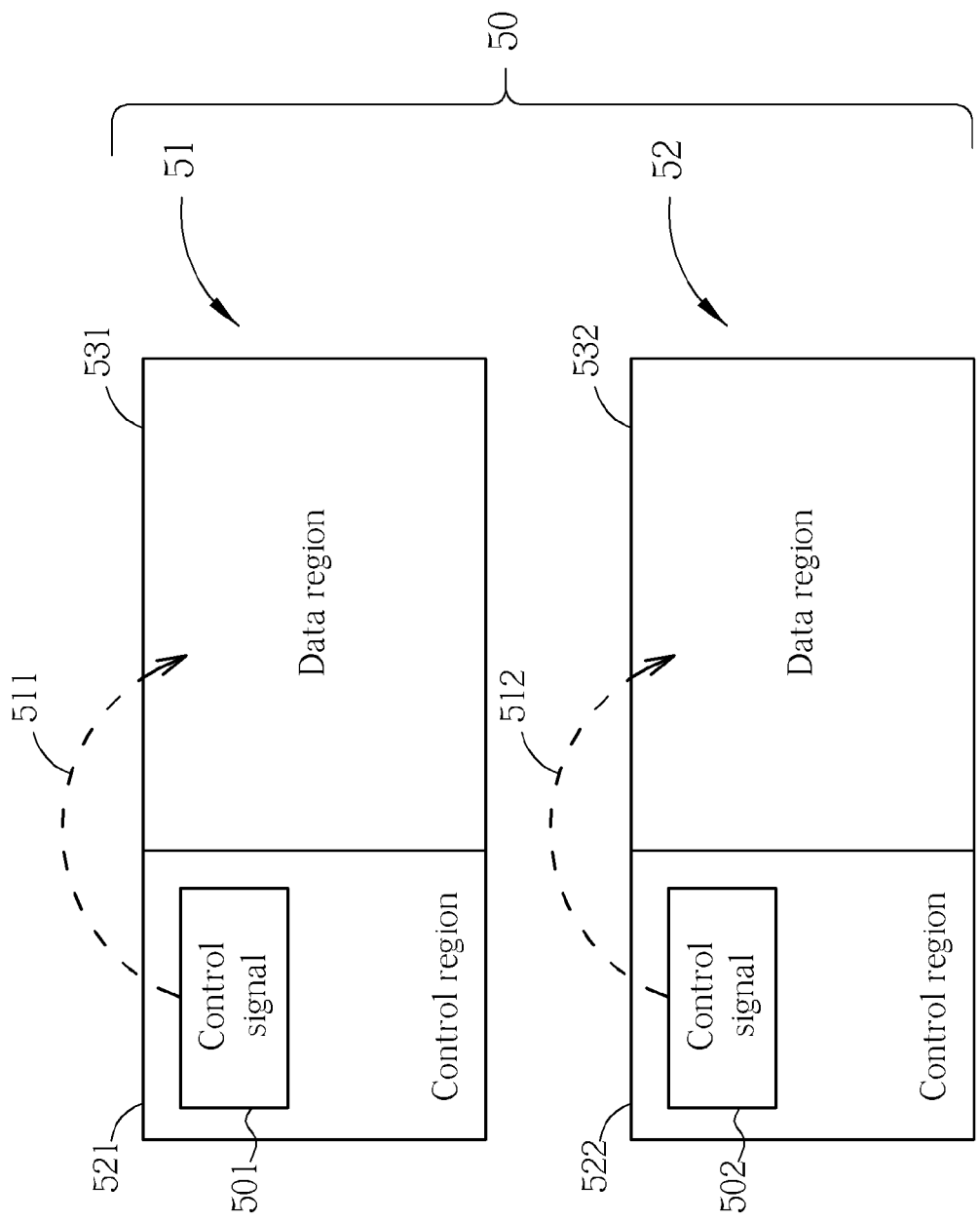
FIG. 5 is a diagram illustrating a first embodiment according to the carrier indication method of FIG. 4.

Please refer to FIG. 5. FIG. 5 is a diagram illustrating a first embodiment according to the carrier indication method 40 of the present invention. As shown in FIG. 5, a carrier aggregation function 50 aggregates a carrier 51 and a carrier 52 and makes use of the two for communications. The carrier 51 has a control region 521 for carrying at least one control signal 501, a data region 531 for carrying system data, user data, and/or other information, and a carrier indicator 511. The carrier 52 has a control region 522 for carrying at least one control signal 502, a data region 532 for carrying system data, user data, and/or other information, and a carrier indicator 512. The carrier indicators 511 and 512 are done implicitly by self-carrier indicating manner. The details are described as follows.

While the carriers 51 and 52 are aggregated in the carrier aggregation function 50, the control signal 501 of the carrier 51 is pre-configured to control the data region 531 of the same carrier 51 and the control signal 502 of the carrier 52 is pre-configured to control the data region 532 of the same carrier 52. In this way, the carrier indicators 511 and 512 implicitly indicate the control signals 501 and 502 control the data regions 531 and 532, respectively.

Figure 6:
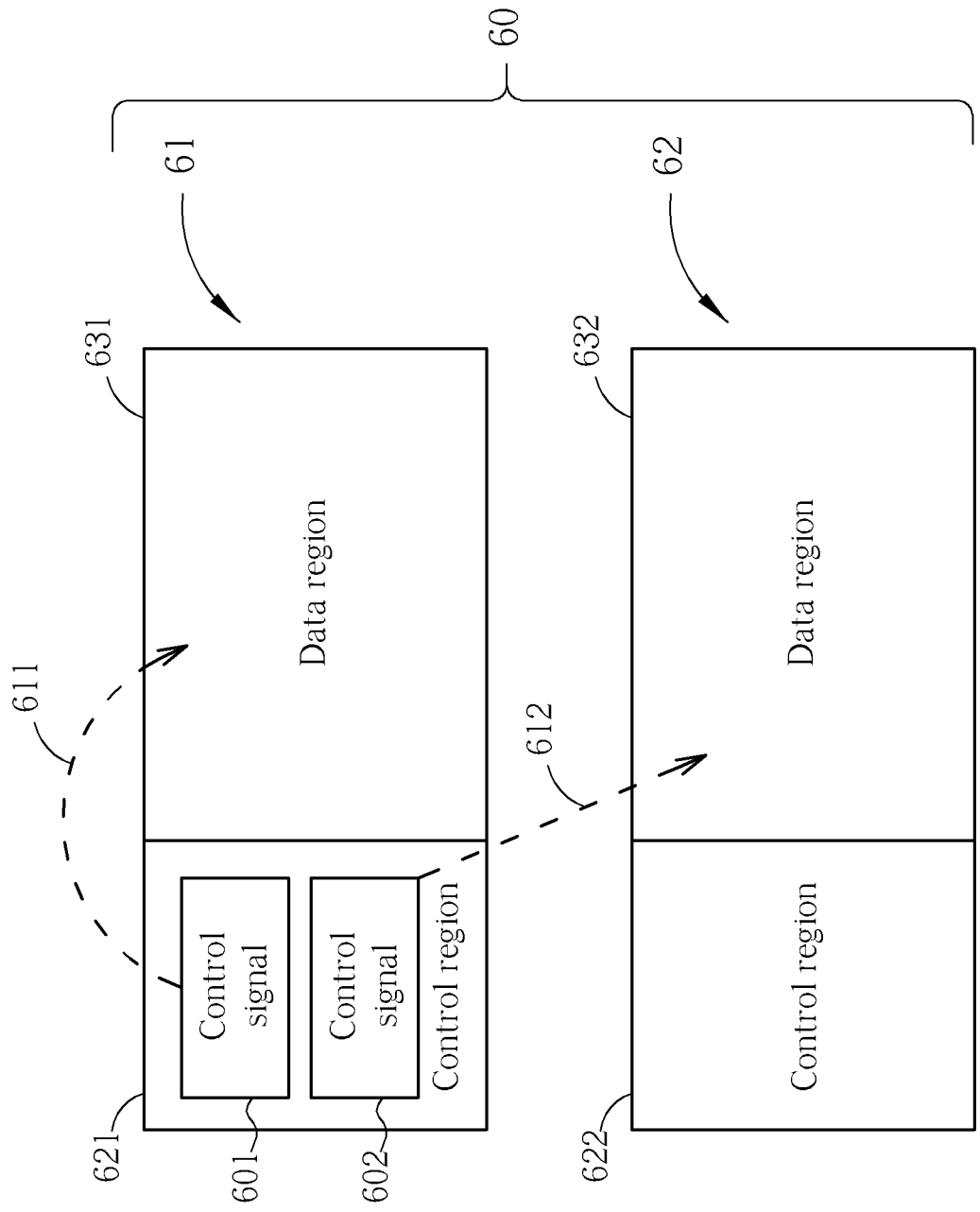
FIG. 6 is a diagram illustrating a second embodiment according to the carrier indication method of FIG. 4.

Please refer to FIG. 6. FIG. 6 is a diagram illustrating a second embodiment according to the carrier indication method 40 of the present invention. As shown in FIG. 6, a carrier aggregation function 60 aggregates a carrier 61 and a carrier 62 and makes use of the two for communications. The carrier 61 has a control region 621 for carrying at least control signals 601 and 602, a data region 631 for carrying system data, user data, and/or other information, and carrier indicators 611 and 612. The carrier 62 has a control region 622 for carrying control signals (not shown), and a data region 632 for carrying system data, user data, and/or other information. The carrier indicators 611 and 612 are done implicitly by self-carrier and cross-carrier indicating manner respectively. The details are described as follows.

While the carriers 61 and 62 are aggregated in the carrier aggregation function 60, the control signal 601 of the carrier 61 is pre-configured to control the data region 631 of the same carrier 61 and the control signal 602 of the carrier 61 is pre-configured to control the data region 632 of the carrier 62 different from the carrier 61. In this way, the carrier indicators 611 and 612 implicitly indicate the control signals 601 and 602 control the data regions 631 and 632, respectively.

Possible pre-configuration of carrier indicator can be in order repeated in a series of received control signals, i.e. a type X of carrier indicator, e.g. the carrier indicator 611 (self-carrier) is utilized to the odd numbers of control signals and another type Y of carrier indicator, e.g. the carrier indicator 612 (cross-carrier) is utilized to the even numbers of control signals. In other words, during the pre-configuration, if a control signal of a carrier is to control the same carrier, the control signal is arranged in an odd order so that the corresponding carrier indicator indicates the control signal is dedicated to the data region of the same carrier. Similarly, if the control signal of a carrier is to control another carrier, the control signal is arranged in an even order so that the corresponding carrier indicator indicates the control signal is dedicated to the data region of the other carrier. Another way for implicitly indicating manner can be, e.g. sequentially, the first control signal is indicated to the first carrier, the second control signal is indicated to the second carrier, the third control signal is indicated to the third carrier, and so on.

Figure 7:
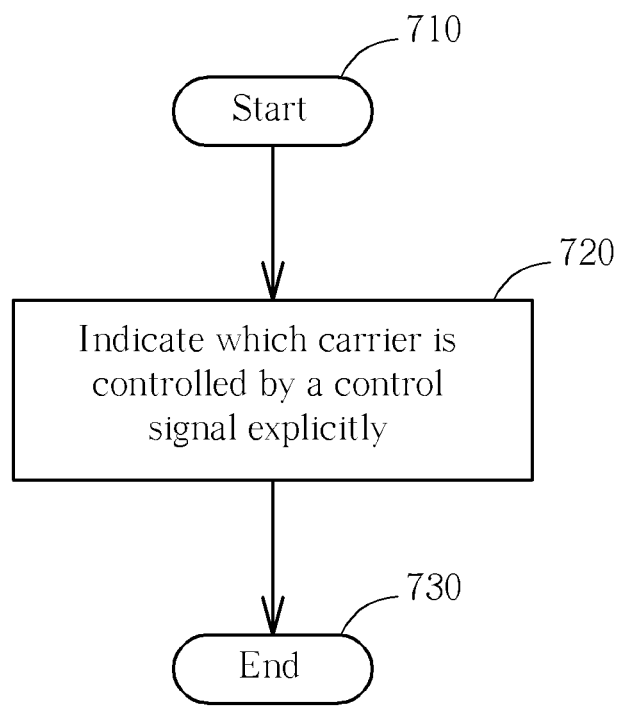
FIG. 7 is a flowchart illustrating a carrier indication method according to a second embodiment of the present invention.

Please refer to FIG. 7. FIG. 7 is a flowchart illustrating a carrier indication method 70 according to a second embodiment of the present invention. The carrier indication method 70 is utilized for indicating relation between carriers and control signals of a carrier aggregation function in the wireless communication system 20. The method 70 comprises the following steps:

Step 710: Start.

Step 720: Indicate which carrier(s) is controlled by a control signal explicitly.

Step 730: End.

In step 720, a control signal of one carrier, to be dedicated for the data region of the same carrier or another carrier, can be indicated explicitly. The term "explicitly", in the present invention, can be explained as the relation between the control signals and the carriers is pointed out by additional carrier indication fields during the configuration between the network and the UE and therefore it is not necessary that the relation between the control signals and the carriers has to be determined during the configuration between the network and the UE.

Figure 8:
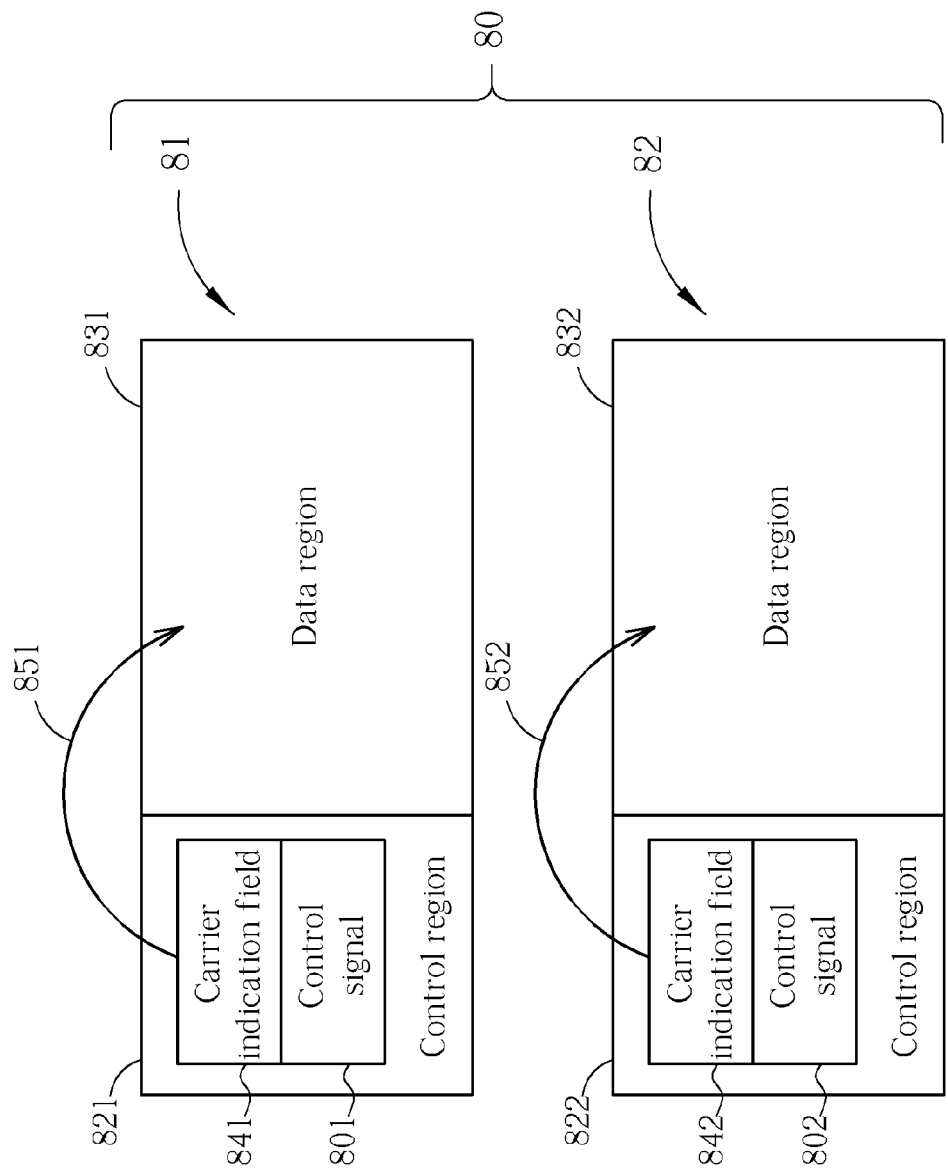
FIG. 8 is a diagram illustrating a first embodiment according to the carrier indication method of FIG. 7.

Please refer to FIG. 8. FIG. 8 is a diagram illustrating a first embodiment according to the carrier indication method 70 of the present invention. As shown in FIG. 8, a carrier aggregation function 80 aggregates a carrier 81 and a carrier 82 and makes use of the two for communications. The carrier 81 has a control region 821 for carrying at least one control signal 801, a data region 831 for carrying system data, user data, and/or other information, a carrier indicator 851, and a carrier indication field 841. The carrier 82 has a control region 822 for carrying at least one control signal 802, a data region 832 for carrying system data, user data, and/or other information, a carrier indicator 852, and a carrier indication field 842. The carrier indicators 851 and 852 are done explicitly by self-carrier indicating manner. The details are described as follows.

While the carriers 81 and 82 are aggregated in the carrier aggregation function 80, the control signals 801 and 802 are added with the carrier indication fields 841 and 842, respectively. The carrier indication field 841 explicitly indicates the data region 831 of the carrier 81 is controlled by the control signal 801 of the same carrier 81. The carrier indication field 852 explicitly indicates the data region 832 of the carrier 82 is controlled by the control signal 802 of the same carrier 82. In this way, the carrier indicator 851 is done by the carrier indication field 841 and explicitly indicates the data region 831 is controlled by the control signal 801 of the same carrier 81; the carrier indicator 852 is done by the carrier indication field 842 and explicitly indicates the data region 832 is controlled by the control signal 802 of the same carrier 82.

Figure 9:
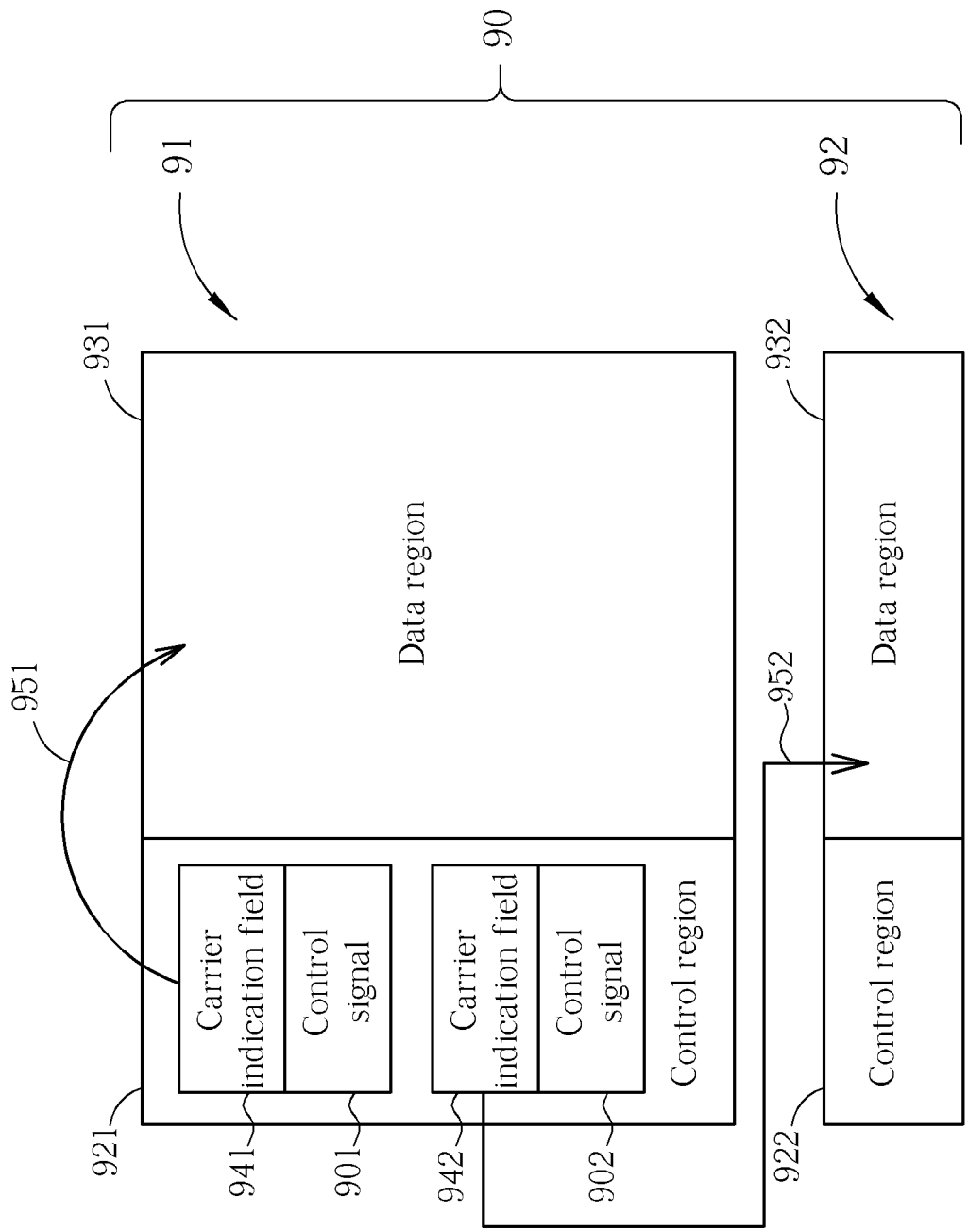
FIG. 9 is a diagram illustrating a second embodiment according to the carrier indication method of FIG. 7.

FIG. 9 is a diagram illustrating a second embodiment according to the carrier indication method 70 of the present invention. As shown in FIG. 9, a carrier aggregation function 90 aggregates a carrier 91 and a carrier 92 and makes use of the two for communications. The carrier 91 has a control region 921 for carrying at least control signals 901 and 902, a data region 931 for carrying system data, user data, and/or other information, carrier indicators 951 and 952, and a carrier indication fields 941 and 942. The carrier 92 has a control region 922 for carrying control signals (not shown), and a data region 932 for carrying system data, user data, and/or other information. The carrier indicators 951 and 952 are done explicitly by self-carrier and cross-carrier indicating manner, respectively. The details are described as follows.

While the carriers 91 and 92 are aggregated in the carrier aggregation function 90, the control signals 901 and 902 are added with the carrier indication fields 941 and 942, respectively. The carrier indication field 941 explicitly indicates the data region 931 of the carrier 91 is controlled by the control signal 901 of the same carrier 91. The carrier indication field 942 explicitly indicates the data region 932 of the carrier 92 is controlled by the control signal 902 of the carrier 91 different from the carrier 92. In this way, the carrier indicator 951 is done by the carrier indication field 941 and explicitly indicates the data region 931 is controlled by the control signal 901 of the same carrier 91; the carrier indicator 952 is done by the carrier indication field 942 and explicitly indicates the data region 932 is controlled by the control signal 802 of the carrier 91 different from the carrier 92.

Figure 10:
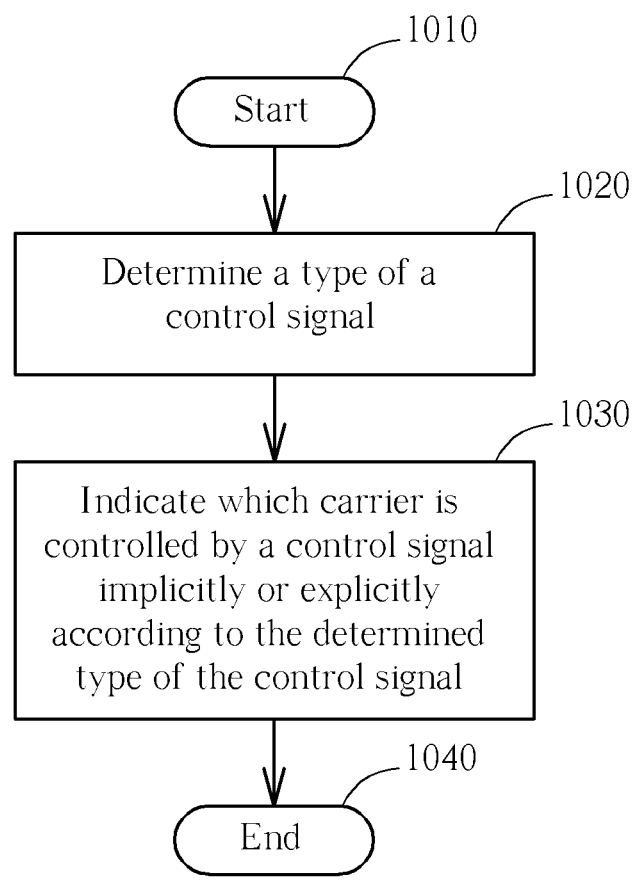
FIG. 10 is a flowchart illustrating a carrier indication method according to a third embodiment of the present invention.

FIG. 10 is a flowchart illustrating a carrier indication method 100 according to a third embodiment of the present invention. The method 100 is utilized for indicating relation between carriers and control signals of a carrier aggregation function in the wireless communication system 20. The method 100 comprises the following steps:

Step 1010: Start.

Step 1020: Determine a type of a control signal.

Step 1030: Indicate which carrier(s) is controlled by a control signal implicitly or explicitly according to the determined type of the control signal.

Step 1040: End.

In step 1020, the control signals may be classified into different categories according to their types, and different schemes for carrier indicator will be selected according to the categories and are executed in step 1030. For example, in step 1020, control signals S3, S4, and S5 are classified into category A, and control signals S6, S7, and S8 are classified into category B. If the control signals of categories A and B are set to be indicated implicitly and explicitly, respectively, then, in step 1030, control signals S3, S4, and S5 are indicated implicitly, and control signals S6, S7, and S8 are indicated explicitly. Besides, in step 1030, a control signal of one carrier can be dedicated and indicated to control the data region of the same carrier or another carrier as well.

More specifically, in the control region, there might be many kinds of control signals for various purposes. Some may be used for system-wide control and some may be used for user specific control. For example, the 3GPP LTE Release 8 control signals and 3GPP LTE-Advanced Release 10 control signals can be determined to be, e.g. types D and E, respectively. The carrier indicators for the control signals of the type D may be in implicit manner, which means the control signals of the type D are pre-configured for the dedication and therefore are indicated implicitly. The carrier indicator for the control signals of the type E may be in explicit manner, which means the control signals of the type E are added with carrier indication fields and the content of the added carrier indication fields include information of relation between control signals and carriers. Additionally, a control region of a carrier may comprise, for example, only control signals of the type D in a previous transmission time interval (TTI), and comprise only control signals of the type E in a successive TTI. In such condition, the control region of the carrier may employ the implicit manner (without carrier indication fields) in the previous TTI and employ the explicit manner (with carrier indication fields).

Figure 11:
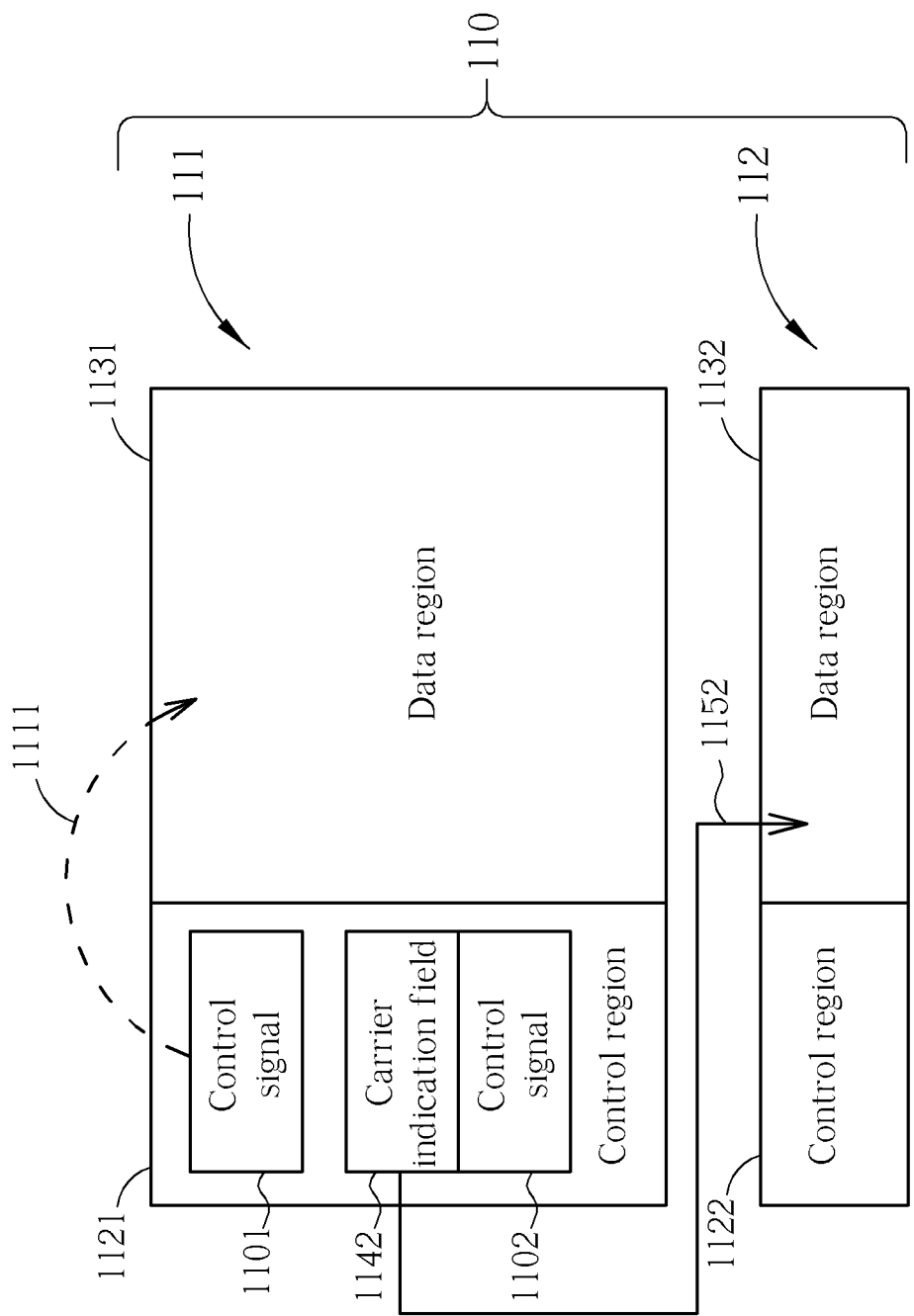
FIG. 11 is a diagram illustrating a first embodiment according to the carrier indication method of FIG. 10.

Please refer to FIG. 11. FIG. 11 is a diagram illustrating a first embodiment according to the carrier indication method 100 of the present invention. As shown in FIG. 11, a carrier aggregation function 110 aggregates a carrier 111 and a carrier 112 and makes use of the two for communications. The carrier 111 has a control region 1121 for carrying at least control signals 1101 and 1102, a data region 1131 for carrying system data, user data, and/or other information, carrier indicators 1111 and 1152, and a carrier indication field 1142. The carrier 112 has a control region 1122 for carrying control signals (not shown), a data region 1132 for carrying system data, user data, and/or other information. The carrier indicator 1111 is done implicitly by self-carrier indicating manner and the carrier indicator 1152 is done explicitly by cross-carrier indicating manner. The details are described as follows.

While the carriers 111 and 112 are aggregated in the carrier aggregation function 110, the control signal 1101 of the carrier 111 is pre-configured to control the data region 1131 of the same carrier 111, and the control signal 1102 is added with the carrier indication field 1142. The carrier indication field 1142 explicitly indicates the data region 1132 of the carrier 112 is controlled by the control signal 1102 of the carrier 111 different from the carrier 112. In this way, the carrier indicator 1111 implicitly indicates the control signal 1101 controls the data regions 1131, and the carrier indicator 1152 is done by the carrier indication field 1142.

More specifically, in the embodiment of FIG. 11, for example, the carrier 111 can be a 3GPP LTE-Advanced Release 10 carrier with compatible transmission of 3GPP LTE Release 8. The control signal 1101 is a Downlink Control Indicator (DCI) and has no carrier indication field and the carrier indicator 1111 is employed as shown in the FIG. 11. The control signal 1102 is a Downlink Control Indicator (DCI) and can have/add a carrier indication field 1142 to explicitly indicate the DCI is dedicated for the carrier 112.

Figure 12:
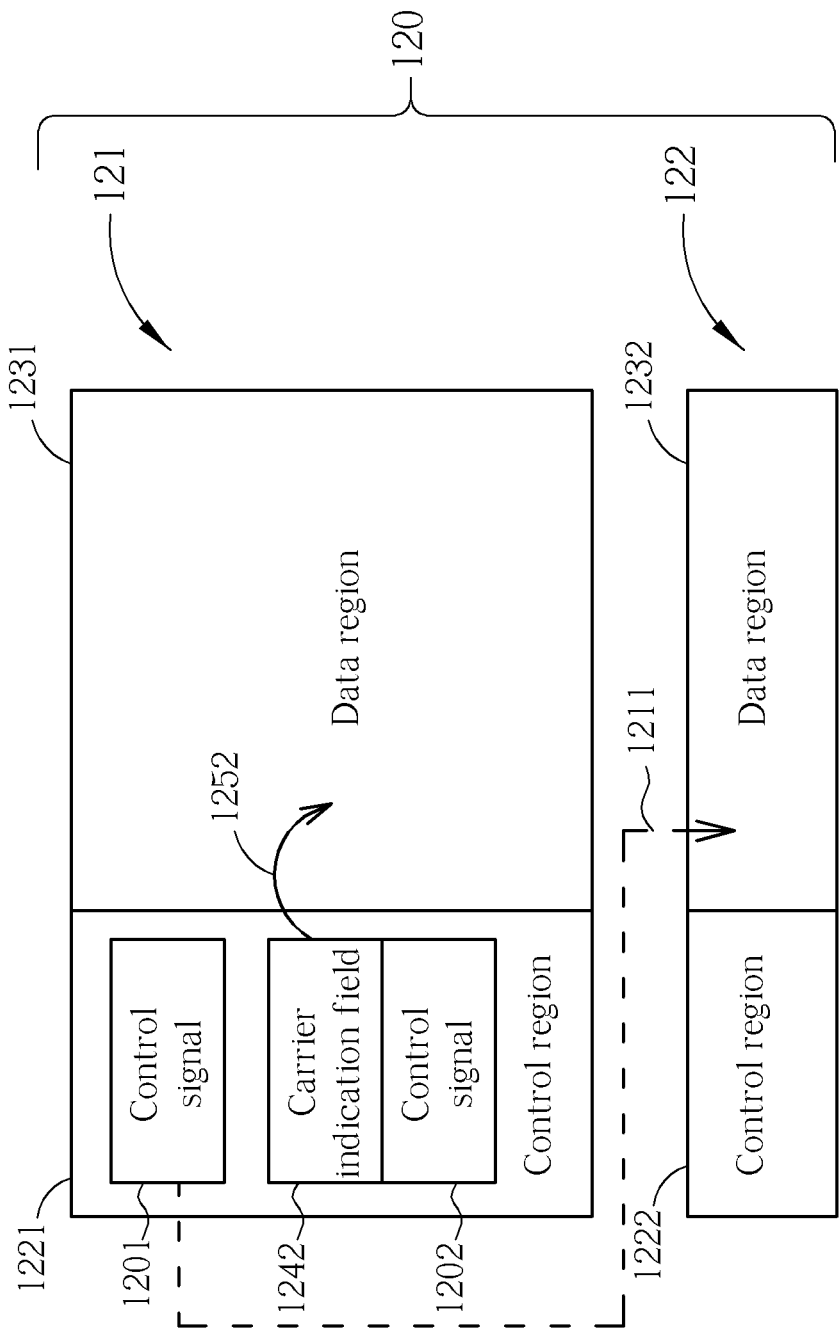
FIG. 12 is a diagram illustrating a second embodiment according to the carrier indication method of FIG. 10.

Please refer to FIG. 12. FIG. 12 is a diagram illustrating a second embodiment according to the carrier indication method 100 of the present invention. As shown in FIG. 12, a carrier aggregation function 120 aggregates a carrier 121 and a carrier 122 and makes use of the two for communications. The carrier 121 has a control region 1221 for carrying at least control signals 1201 and 1202, a data region 1231 for carrying system data, user data, and/or other information, carrier indicators 1211 and 1252, and a carrier indication field 1242. The carrier 112 has a control region 1222 for carrying control signals (not shown), a data region 1232 for carrying system data, user data, and/or other information. The carrier indicator 1211 is done implicitly by cross-carrier indicating manner and the carrier indicator 1252 is done explicitly by self-carrier indicating manner. The details are described as follows.

While the carriers 121 and 122 are aggregated in the carrier aggregation function 120, the control signal 1201 of the carrier 121 is pre-configured to control the data region 1232 of the carrier 122 different from the carrier 121, and the control signal 1202 is added with the carrier indication field 1242. The carrier indication field 1242 explicitly indicates the data region 1231 of the carrier 121 is controlled by the control signal 1202 of the same carrier 121. In this way, the carrier indicator 1211 implicitly indicates the control signal 1201 controls the data region 1232 of another carrier, and the carrier indicator 1252 is done by the carrier indication field 1142 and explicitly indicates the control signal 1202 controls the data region 1231 of the same carrier.

Additionally, the numbers of aggregated carriers can be more than two. The aggregated carriers can carry varied system transmissions, such as 3GPP LTE, LTE-Advanced, UMTS, HSPA, EDGE, GSM. For example, 2 LTE carriers and 1 LTE-Advanced carrier are aggregated together and the carrier indicator(s) on each carrier is by means of the proposed method. For example, 3 LTE carriers and 2 HSPA carriers are aggregated together and the carrier indicator(s) on each carrier is by means of the proposed methods. The aggregated carriers can be FDD, H-FDD, TDD, and hybrid of them. The carrier in the present invention may be an uplink carrier or a downlink carrier, and has suitable system bandwidths, such as 1.4, 2.5, 5, 10, 15, 20 MHz. The control region and the data region on a carrier are usually repeated periodically at a suitable rate, such as 1, 2, 5, 10 ms. The control region may have varied sizes within the carrier, such as smaller bandwidths than that of the carrier, varied bandwidths, varied lengths on time domain. The data region may have varied sizes within the carrier, such as smaller bandwidths than that of the carrier, various bandwidths, varied lengths on time domain. The position relation between the control region and the data region may be exchanged, surrounded, or any possible relative positions. The carrier indicator can belong to one or multiple control signals and indicates that certain part of or the whole data region is controlled according to the control signals. The numbers of the control region, the data region, the carrier indicator, and the carrier indication field may be one or multiple within a carrier.

The advantages of the present invention include, without limitation, that the above-mentioned carrier indication methods and related apparatuses can accommodate general communications, e.g. 3GPP LTE, LTE-Advanced, WCDMA, HSPA, GSM, EDGE, etc., with varied carrier indication strategies and helpful for compatibilities. Cross-carrier or self-carrier indications are both feasible for varied systems and their evolved versions and releases. While applying to 3GPP LTE/LTE-Advanced system, for example, a control region corresponds to the PDCCH in LTE/LTE-Advanced system; a data region corresponds to PDSCH in LTE/LTE-Advanced system, the control signals controls with carrier indications corresponds to DCIs in LTE/LTE-Advanced system, and a carrier indication field corresponds to an explicit field in some DCI formats of LTE/LTE-Advanced system. All of above-mentioned methods are feasible in practical systems and provide better carrier indications for carrier aggregation applications.

Furthermore, while applying a carrier indication field, as for embodiments in FIG. 8, FIG. 9, FIG. 11, and FIG. 12, the numbering and addressing methods to an associated carrier of the present invention are proposed as follows.

The first method for numbering and addressing in a carrier indication field is proposed to make use of the all deployed carriers. All deployed carriers are numbered in order according to certain criteria and use the numbering in the carrier indication field. The criteria can be frequency, definition in the system technical specifications, operator's preferences, etc. The resulting carrier index will be system-specific.

The second method for numbering and addressing in a carrier indication field is proposed to refer to a selected carrier set for a user equipment or a group of user equipments. The set of carriers can be selected by user equipments or the system among available carriers in deployment according to capabilities of user equipments, user preferences, etc. These selected carriers are then numbered according to operator's order, frequency, definitions in the system specifications, etc. and then used in a carrier indication field.

To sum up, the present invention provides a set of carrier indication methods and apparatuses using self-carrier indication, implicit indication, cross-carrier indication, explicit indication for indicating which channel(s) the control signals are dedicated to in varied multiple carrier usage scenarios, enhancing the efficiency of the entire wireless communication system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A carrier indication method for a carrier aggregation function, which aggregates a plurality of carriers for a transmission between a network and a user equipment of a wireless communication system, the carrier indication method comprising:
   a processor of the network accessing a program code to determine a type of a first control signal in a first carrier of the plurality of carriers to be either excluding or including a carrier indication field; and
   the processor accessing the program code to indicate the first control signal to control a second carrier of the plurality of the carriers different from the first carrier,
   wherein when the type of the first control signal is determined to be excluding the carrier indication field, the first control signal is arranged in a first predetermined order which indicates that the first control signal is utilized for controlling the second carrier.

2. The carrier indication method of claim 1, wherein control signals dedicated to each of the plurality of carriers are arranged in a predetermined order corresponding to the order of the plurality of carriers.

3. The carrier indication method of claim 1, further comprising:
   when the type of the first control signal is determined to be including the carrier indicated field, the processor accessing the program code to indicate the first control signal to control the second carrier according to the carrier indication field.

4. The carrier indication method of claim 3, further comprising:
   the processor accessing the program code to give the second carrier a predetermined number according to a predetermined criterion; and
   the processor accessing the program code to use the predetermined number as content of the carrier indication field, for generating the carrier indication field.

5. The carrier indication method of claim 4, wherein the predetermined criterion is of frequency of the second carrier.

6. The carrier indication method of claim 1, further comprising:
   the processor accessing the program code to determine a type of a second control signal which is also in the first carrier of the plurality of carriers; and
   the processor accessing the program code to indicate the second control signal to control the first carrier, wherein when the type of the second control signal is determined to be excluding the carrier indication field, the second control signal is arranged in a second predetermined order which indicates that the second control signal is utilized for controlling the first carrier.

7. The carrier indication method of claim 6, further comprising:
   when the type of the second control signal is determined to be including a carrier indication field, the processor accessing the program code to indicate the second control signal to control the first carrier according to the carrier indication field.

8. The carrier indication method of claim 7, further comprising:
   the processor accessing the program code to give the first carrier a predetermined number according to a predetermined criterion; and
   the processor accessing the program code to use the predetermined number as content of the carrier indication field.

9. The carrier indication method of claim 8, wherein the predetermined criterion is of frequency of the first carrier.

10. A carrier indication method for a carrier aggregation function, which aggregates a plurality of carriers for a transmission between a network and a user equipment of a wireless communication system, the carrier indication method comprising:
    a processor of the network accessing a program code to indicate a first control signal in a first transmission time interval (TTI) in a first carrier of the plurality of carriers to control a transmission in the first TTI in a second carrier of the plurality of carriers and indicate a second control signal in the first TTI in the first carrier to control a transmission in a second TTI in a third carrier of the plurality of carriers;
    wherein the first and the second transmission time intervals are different.

11. The carrier indication method of claim 10, wherein the processor of the network accessing the program code to indicate the first control signal in the first TTI in the first carrier to control the transmission of the first TTI in the second carrier and indicate the second control signal in the first TTI in the first carrier to control the transmission in the second TTI in the third carrier of the plurality of carriers comprises:
    the processor accessing the program code to determine types of the first and the second control signals;
    when the type of the first control signal is of a first predetermined type, the processor accessing the program code to indicate the first control signal, arranged according to a first predetermined rule, in the first TTI in the first carrier to control the transmission in the first TTI in the second carrier;
    when the type of the first control signal is of a second predetermined type, the processor accessing the program code to add a first carrier indication field to the first control signal and indicate the first control signal in the first TTI in the first carrier to control the transmission in the first TTI in the second carrier according to the first carrier indication field;
    when the type of the second control signal is of the first predetermined type, the processor accessing the program code to indicate the second control signal, arranged according to the first predetermined rule, in the first TTI in the first carrier to control the transmission of the second TTI in the third carrier; and
    when the type of the second control signal is of the second predetermined type, the processor accessing the program code to add a second carrier indication field to the second control signal and indicate the second control signal in the first TTI in the first carrier to control the transmission in the second TTI in the third carrier according to the second carrier indication field.

12. The carrier indication method of claim 11, further comprising:
    the processor accessing the program code to assign a first set of the plurality of carriers with a first plurality of numbers respectively in order according to certain criteria; and the processor accessing the program code to assign the first carrier indication field with a first number among the first plurality of numbers;

wherein the first number is that the first carrier is numbered with.

13. The carrier indication method of claim 12, wherein the first set of the plurality of carriers represents a part of the plurality of carriers or the entire plurality of the carriers.

14. The carrier indication method of claim 12, wherein the certain criteria can be frequency, definition in the system technical specifications, or an operator's preferences.

* * * * *